United States Patent
Lee et al.

(10) Patent No.: US 9,741,997 B2
(45) Date of Patent: Aug. 22, 2017

(54) RECHARGEABLE BATTERY

(71) Applicant: SAMSUNG SDI CO., LTD., Yongin-si, Gyeonggi-do (KR)

(72) Inventors: Wonjun Lee, Yongin-si (KR); Sangwon Byun, Yongin-si (KR); Seungho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 4 days.

(21) Appl. No.: 14/819,308

(22) Filed: Aug. 5, 2015

(65) Prior Publication Data

US 2016/0126534 A1    May 5, 2016

(30) Foreign Application Priority Data

Nov. 5, 2014  (KR) .................. 10-2014-0153085
Feb. 4, 2015  (KR) .................. 10-2015-0017294

(51) Int. Cl.
*H01M 2/22* (2006.01)
*H01M 2/34* (2006.01)
*H01M 2/06* (2006.01)

(52) U.S. Cl.
CPC ............ *H01M 2/348* (2013.01); *H01M 2/06* (2013.01); *H01M 2/22* (2013.01); *H01M 2200/103* (2013.01)

(58) Field of Classification Search
CPC .. H01M 2/348; H01M 2/22; H01M 2200/103; H01M 2/06; H01M 2/34
See application file for complete search history.

(56) References Cited

U.S. PATENT DOCUMENTS

| 2011/0177365 | A1 | 7/2011 | Yasui et al. |
| 2013/0295445 | A1 | 11/2013 | Byun |
| 2014/0170449 | A1 | 6/2014 | Takahashi et al. |
| 2014/0315055 | A1 * | 10/2014 | Byun ............. H01M 2/34 429/61 |
| 2014/0377601 | A1 | 12/2014 | Kim |

FOREIGN PATENT DOCUMENTS

| EP | 0 570 590 A1 | 11/1993 |
| KR | 10-2011-0133255 A | 12/2011 |
| KR | 10-2012-0052189 A | 5/2012 |
| KR | 10-2014-0147351 A | 12/2014 |

OTHER PUBLICATIONS

EPO Search Report dated Nov. 13, 2015, for corresponding European Patent application 15185578.0, (8 pages).

* cited by examiner

*Primary Examiner* — Mark F Huff
*Assistant Examiner* — Monique Wills
(74) *Attorney, Agent, or Firm* — Lewis Roca Rothgerber Christie LLP

(57) ABSTRACT

A rechargeable battery includes fuses inside and outside a cell, thereby improving safety by preventing abnormal breakdown from occurring in the cell due to an electric short circuit. The rechargeable battery includes an electrode assembly including a first electrode plate, a second electrode plate and a separator between the first electrode plate and the second electrode plate, a case accommodating the electrode assembly, and a first electrode terminal and a second electrode terminal electrically connected to the first electrode plate and the second electrode plate and protruding to the outside of the case. One of the first electrode terminal and the second electrode terminal includes a fuse part.

19 Claims, 6 Drawing Sheets

RECHARGEABLE BATTERY

CROSS-REFERENCE TO RELATED APPLICATIONS

This application claims priority to and the benefit of Korean Patent Applications No. 10-2014-0153085 filed on Nov. 5, 2014 and No. 10-2015-0017294 filed on Feb. 4, 2015 in the Korean Intellectual Property Office, the contents of which in its entirety are herein incorporated by reference.

BACKGROUND

1. Field

The present invention relates to a rechargeable battery.

2. Description of the Related Art

A rechargeable battery can be repeatedly charged and discharged, unlike a primary battery that cannot be recharged. A low-capacity rechargeable battery is typically used for a small portable electronic device such as a mobile phone, and a camcorder. A large-capacity rechargeable battery, obtained by connecting several battery cells in a pack shape, is widely used as a power supply for driving a motor of a hybrid vehicle and the like.

Rechargeable batteries are manufactured in various shapes, for example, a cylindrical shape and a prismatic shape. A rechargeable battery is typically constructed with an electrode assembly including a positive electrode and a negative electrode with a separator interposed between the positive and negative electrodes, a case accommodating the electrode assembly, and a cap assembly.

When the battery is overcharged and/or an electrolyte inside the case has decomposed, the rechargeable battery may generate excessive heat and the internal pressure of the rechargeable battery may increase, which may cause the rechargeable battery to ignite and/or explode. Accordingly, there is a need for a rechargeable battery having improved safety under the aforementioned or similar conditions.

SUMMARY

Embodiments of the present invention provide a rechargeable battery having fuses inside and outside of a cell, thereby improving safety by preventing (or minimizing) abnormal breakdown in the cell following an electric short circuit.

The above and other objects of the present invention will be described in or be apparent from the following description of the preferred embodiments.

According to one or more embodiments of the present invention, a rechargeable battery includes an electrode assembly including a first electrode plate, a second electrode plate and a separator between the first electrode plate and the second electrode plate, a case that accommodates the electrode assembly, and a first electrode terminal and a second electrode terminal electrically connected to the first electrode plate and the second electrode plate, respectively, and protruding to the outside of the case, wherein one of the first electrode terminal and the second electrode terminal includes a fuse part.

The first electrode terminal may include a first upper body part coupled to a first terminal plate outside of the case, a first lower body part connected to the first electrode plate inside of the case, and a first fuse part between the first upper body part and the first lower body part.

The first fuse part may have a greater electrical resistance than the first upper body part and/or the first lower body part.

The first fuse part may have a smaller sectional area than the first upper body part and/or the first lower body part.

The first fuse part may have a smaller thickness than the first upper body part and/or the first lower body part.

The first electrode terminal may include an electrode body part protruding to the outside of the case, and a first fuse part extending to the inside of the case from one end of the electrode body part.

The second electrode terminal may include a second upper body part coupled to a second terminal plate outside of the case, a second lower body part connected to the second electrode plate inside of the case, and a second fuse part between the second upper body part and the second lower body part.

The second fuse part may have a greater electrical resistance than the second upper body part and/or the second lower body part.

The second fuse part may have a smaller sectional area than the second upper body part and/or the second lower body part.

The second fuse part may have a smaller thickness than the second upper body part and/or the second lower body part.

The rechargeable battery may further include a first collector plate and a second collector plate at opposite sides of the electrode assembly to electrically connect the first electrode plate and the second electrode plate to the first electrode terminal and the second electrode terminal, respectively, wherein the first collector plate includes a third fuse part.

The first collector plate may include a connection part coupled to the first electrode terminal and an extension part extending from the connection part and coupled to the first electrode plate.

The third fuse part may be formed in the connection part and spaced apart from the first electrode terminal.

The first fuse part may have a greater electrical resistance than an electrical resistance of the third fuse part.

The rechargeable battery may further include a cap assembly that seals the case and includes a cap plate having a short-circuit hole, wherein the cap assembly includes an inversion plate in the short-circuit hole.

The first fuse part may have a height in a lengthwise direction of the first electrode terminal, wherein the height is equal to or smaller than a thickness of the cap plate.

The inversion plate may include a round part that is downwardly convex, and an edge part fixed to the cap plate.

When the internal pressure of the rechargeable battery exceeds a predefined pressure, the inversion plate may be inverted and contact the second terminal plate.

The inversion plate may be electrically connected to the second electrode plate.

As described above, the rechargeable battery according to one or more embodiments of the present invention includes a fuse in a collector plate positioned inside a cell and a fuse in an electrode terminal positioned outside the cell, wherein the fuse formed outside the cell may melt earlier than the fuse formed inside the cell when an electric short circuit occurs.

Accordingly, in the rechargeable battery according to one or more embodiments of the present invention, arcing generated by an electric short circuit may occur outside the cell, minimizing (or preventing) an abnormal breakdown inside the cell and thus improving the safety of the rechargeable battery.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION

Hereinafter, examples of embodiments of the invention are described with reference to the accompanying drawings such that they can easily be made and used by those skilled in the art.

Figure 1:
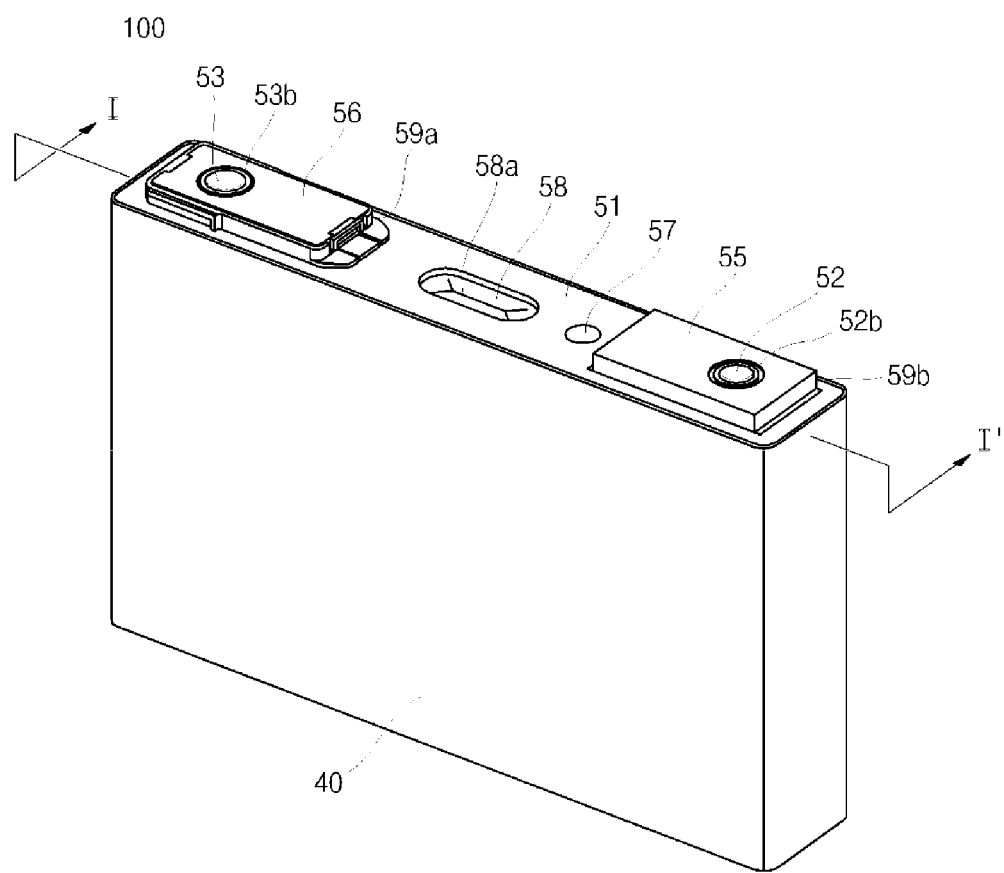
FIG. 1 is a perspective elevation view of a rechargeable battery according to one or more embodiments of the present invention.
Figure 2:
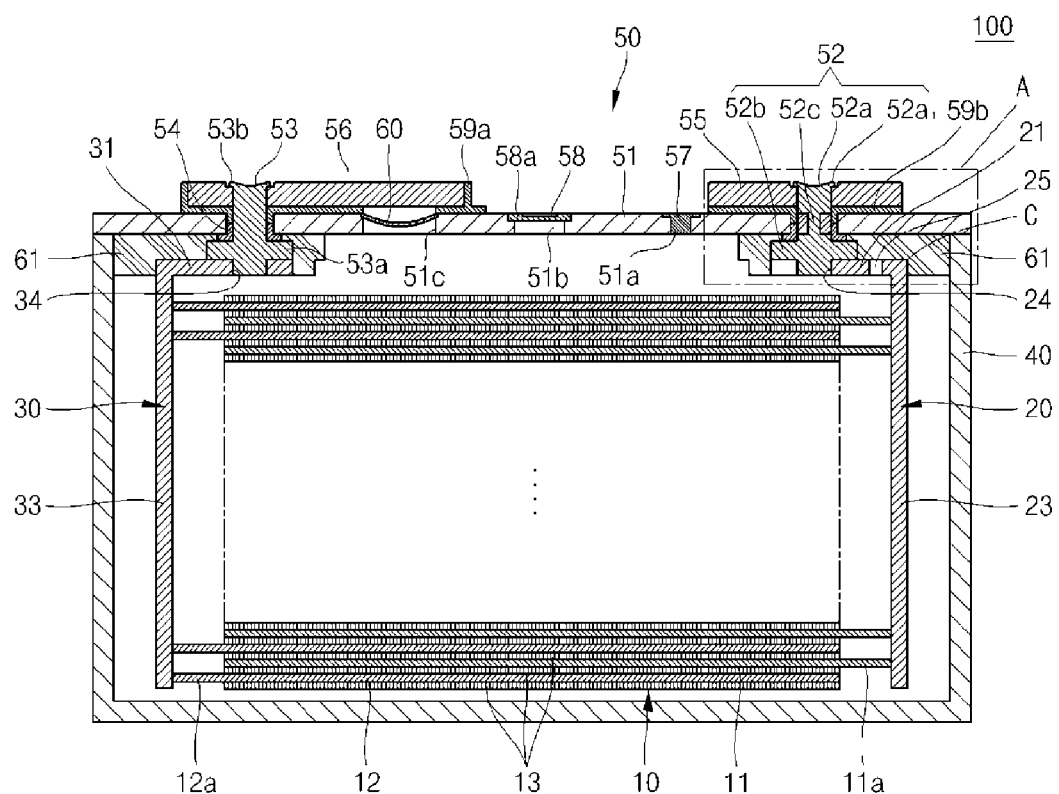
FIG. 2 is a cross-sectional view of the rechargeable battery taken along the line I-I' of FIG. 1.
Figure 3:
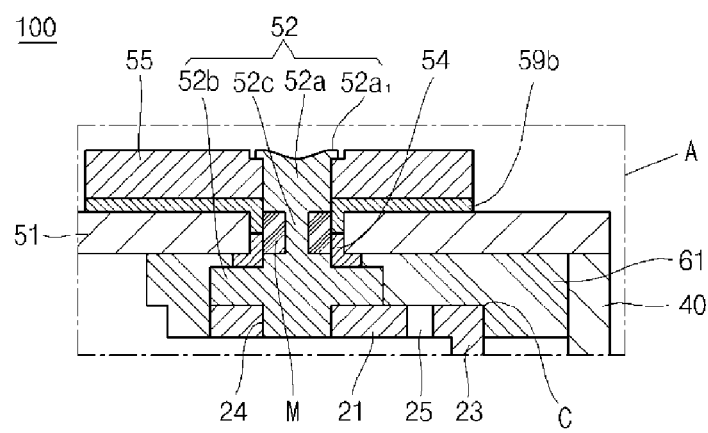
FIG. 3 is an enlarged cross-sectional view illustrating a section 'A' of FIG. 2.
Figure 4:
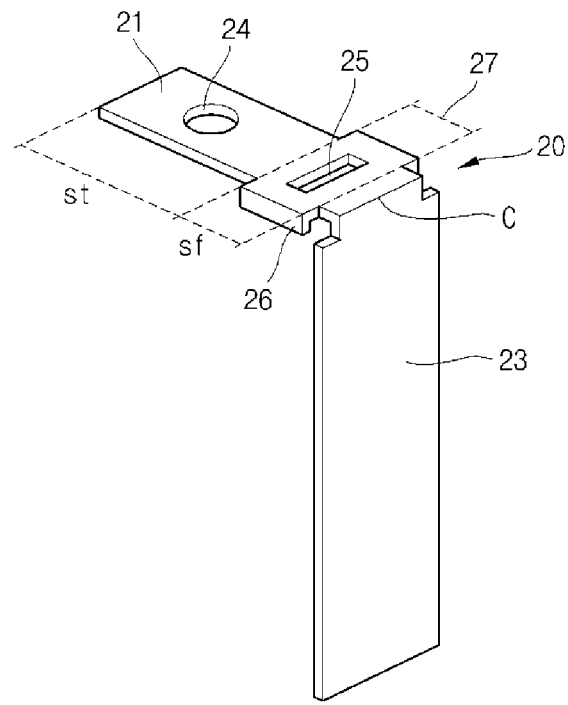
FIG. 4 is a perspective view illustrating a first collector plate of FIG. 2.

FIG. 1 is a perspective elevation view of a rechargeable battery according to one or more embodiments of the present invention, FIG. 2 is a cross-sectional view of the rechargeable battery taken along the line I-I' of FIG. 1, FIG. 3 is an enlarged cross-sectional view illustrating a section 'A' of FIG. 2, and FIG. 4 is a perspective view illustrating a first collector plate of FIG. 2.

Referring to FIGS. 1 and 2, the rechargeable battery 100 according to one or more embodiments of the present invention includes an electrode assembly 10, a first collector plate 20, a second collector plate 30, a case 40 and a cap assembly 50.

The electrode assembly 10 is formed by winding or laminating a stacked structure including a first electrode plate 11, a separator 13 and a second electrode plate 12, which are thin plates or layers. The first electrode plate 11 may function as a positive electrode and the second electrode plate 12 may function as a negative electrode.

The first electrode plate 11 may be formed by coating a first electrode active material, e.g., a transition metal oxide, on a first electrode collector formed of a metal foil, e.g., made of aluminum, and includes a first electrode uncoated region 11a, i.e., a region not coated with the first electrode active material. The first electrode uncoated region 11a becomes a path of the flow of current between the first electrode plate 11 and the outside thereof (i.e., between the first electrode plate 11 and the first collector plate 20). However, the material of the first electrode plate 11 is not limited to that listed herein.

The second electrode plate 12 may be formed by coating a second electrode active material, e.g., graphite or carbon, on a second electrode collector formed of a metal foil, e.g., made of copper or nickel, and includes a second electrode uncoated region 12a, i.e., a region not coated with the second electrode active material. The second electrode uncoated region 12a becomes a path of the flow of current between the second electrode plate 12 and the outside thereof (i.e., between the second electrode plate 12 and the second collector plate 30). However, the material of the second electrode plate 12 is not limited to those disclosed herein.

The polarities of the first electrode plate 11 and the second electrode plate 12 may be reversed. For example, the first electrode plate 11 may be a negative electrode and the second electrode plate 12 may be a positive electrode.

The separator 13 is positioned between the first electrode plate 11 and the second electrode plate 12 to prevent an electric short circuit therebetween and to allow lithium ions to move therebetween. The separator 13 may include (or may be made of) polyethylene, polypropylene or a composite film thereof. However, the material of the separator 13 is not limited to those disclosed herein.

The first collector plate 20 and the second collector plate 30 are coupled to both ends of the electrode assembly 10, electrically connecting the first electrode plate 11 to the first collector plate 20 and electrically connecting the second electrode plate 12 to the second collector plate 30.

The first collector plate 20 may be made of a conductive material, such as aluminum or the like, and contacts the first electrode uncoated portion 11a, which protrudes to one end of the electrode assembly 10, thereby electrically connecting the first collector plate 20 and the first electrode plate 11. Referring to FIGS. 2 and 4, the first collector plate 20 may include a first connection part 21, a first extension part 23, a first terminal hole 24, a first fuse hole 25 and a fuse protrusion 26.

The first connection part 21 is positioned between an upper portion of the electrode assembly 10 and a lower portion of the cap assembly 50 and is substantially planar. The first extension part 23 may be divided into a first terminal region st wherein the first terminal hole 24 is formed, and a fuse region sf wherein the fuse hole 25 is formed.

The first extension part 23 is bent relative to and extends away from an end of the first connection part 21, is substantially planar, and contacts the first electrode uncoated portion 11a. As illustrated in FIG. 4, the first connection part 21 and the first extension part 23 meet at a corner C, and the first connection part 21 and the first extension part 23 are perpendicular to each other at the corner C (i.e., are bent around the corner C).

The first terminal hole 24 is formed in the first connection part 21, i.e., in the first terminal region st. A first electrode terminal 52 of the cap assembly 50 is fitted and coupled to the first terminal hole 24. In one or more embodiments, the first terminal hole 24 and the corner C of the first connection part 21 are spaced apart from each other.

The fuse hole 25 and the fuse protrusion 26 are formed at (or near) an upper region of the electrode assembly 10, for example, in (or on) the fuse region sf of the first connection part 21, so as to not make contact with an electrolyte inside of the case, thereby minimizing the likelihood of igniting the electrolyte due to heat generated in the fuse region sf. Thus, the fuse region sf is adjacent to the corner C of the first connection part 21 such that the fuse region sf does not overlap with the first electrode terminal 52, which is coupled to the fuse hole 25 and the fuse protrusion 26.

In some embodiments, the fuse hole 25 may be formed as a groove having a smaller thickness than the first connection part 21, as opposed to a hole passing through the first connection part 21. When the internal pressure of the rechargeable battery 100 exceeds a predefined pressure, an inversion plate 60 and a second terminal plate 56 may contact each other, causing an electric short circuit in the rechargeable battery 100. The excessive pressure may result from increased heat generated by overcharge or decomposition of the electrolyte. After the electric short circuit, a large amount of current may flow through the rechargeable battery and generate even more heat inside of the rechargeable battery 100. The fuse hole 25 then functions as a fuse that cuts off the flow of electric current by melting a region around the fuse hole 25 when exposed to excessive heat. Accordingly, when the rechargeable battery 100 is overcharged to a point that causes a short circuit, the fuse hole 25 prevents (or stops) the flow of electric current by melting the region around the fuse hole 25, thereby stopping the rechargeable battery 100 from further charging before the rechargeable battery 100 reaches a dangerous situation, such as ignition and/or explosion.

The fuse protrusion 26 is obliquely bent and extended with respect to a surface of the fuse region sf from an end of the fuse region sf toward the electrode assembly 10, as illustrated in FIG. 4. At least one fuse protrusion 26 may be formed at each of the left and right sides of the fuse hole 25. The fuse protrusion 26 may be bent around the fuse hole 25 and may reinforce the strength of the fuse region sf against external shocks before a short circuit occurs in the rechargeable battery 100. Accordingly, when the rechargeable battery 100 is exposed to an external shock but does not short circuit, the fuse protrusion 26 may prevent the rechargeable battery 100 from being bent or damaged despite a relatively low resistance of the region where the fuse hole 25 is formed by reinforcing the fuse region sf. The fuse region sf where the fuse hole 25 and the fuse protrusion 26 are formed is also referred to as a second fuse part 27.

The second collector plate 30 may be made of a conductive material, such as nickel or copper, and contacts the second electrode uncoated portion 12a, which protrudes to the other end of the electrode assembly 10, electrically connecting the second collector plate 30 to the second electrode plate 12. The second collector plate 30 may include a second connection part 31, a second extension part 33 and a second terminal hole 34.

In one or more embodiments of the present invention, the second collector plate 30 may omit a fuse hole and a fuse protrusion corresponding to the fuse hole 25 and the fuse protrusion 26 of the first collector plate 20 shown in FIG. 4. For example, these features may be omitted from the second collector plate 30 when the fuse hole 25 functioning as a fuse is provided in the first collector plate 20. Further, since the first collector plate 20 is made of a material (e.g., aluminum) having a melting point that is higher than the melting point of a material of the second collector plate 30 (e.g, nickel or copper), the first collector plate 20 may be better suited to operate as a fuse. However, in other embodiments, a fuse hole and a fuse protrusion may be formed in the second collector plate 30 without forming the fuse hole 25 and the fuse protrusion 26 in the first collector plate 20.

The case 40 may be made of a conductive metal, such as aluminum, an aluminum alloy, or nickel plated steel, and has a substantially rectangular parallelepiped prismatic shape having an opening for accommodating the electrode assembly 10, the first collector plate 20 and the second collector plate 30. As shown in FIGS. 1 and 2, the case 40 and the cap assembly 50 are coupled to each other at a substantially open portion at the periphery of the cap assembly 50. The internal surface of the case 40 is insulated from the electrode assembly 10, the first collector plate 20, the second collector plate 30 and the cap assembly 50. In one or more embodiments, the case 40 may have a polarity, for example, a positive polarity.

The cap assembly 50 is coupled to the case 40. The cap assembly 50 may include a cap plate 51, the first electrode terminal 52, a second electrode terminal 53, a gasket 54, a first terminal plate 55 and a second terminal plate 56. In addition, the cap assembly 50 may further include a plug 57, a vent plate 58, an upper insulation member 59a, a connection plate 59b, an inversion plate 60 and a lower insulation member 61.

The cap plate 51 seals the opening of the case 40 and may be made of the same material as the case 40. The cap plate 51 may have the same polarity as the case 40.

The first electrode terminal 52 passes through one side of the cap plate 51 and is electrically coupled to the first collector plate 20.

The first electrode terminal 52 may have the shape of a pillar and may include a first upper body part 52a exposed above an upper portion of the cap plate 51, a first lower body part 52b positioned under the cap plate 51, and a first fuse part 52c at or below the upper portion of the cap plate 51.

The first upper body part 52a may be riveted to the first terminal plate 55 positioned outside the case 40 and a protrusion part 52$a_1$ may be formed to prevent the first electrode terminal 52 from becoming dislodged from the cap plate 51.

The first lower body part 52b is connected to the first collector plate 20 positioned inside the case 40 (i.e., is connected to the first electrode plate 11) and a flange is formed to prevent the first electrode terminal 52 from being dislodged from the cap plate 51. In addition, a portion of the pillar of the first lower body part 52b positioned under the flange is fitted into the first terminal hole 24 of the first collector plate 20. The first electrode terminal 52 may be electrically connected to the cap plate 51.

The first fuse part 52c is formed between the first upper body part 52a and the first lower body part 52b. The first fuse part 52c may have a relatively small thickness so as to have greater electric resistance than the first upper body part 52a and the first lower body part 52b or one of the first upper body part 52a and the first lower body part 52b. In addition, the first fuse part 52c may have a relatively small sectional area so as to have greater electric resistance than the first upper body part 52a and the first lower body part 52b, or one of the first upper body part 52a and the first lower body part 52b. The thickness or sectional area of the first fuse part 52c may vary according to the fuse capacity required following a short circuit in the rechargeable battery 100. In one or more embodiments, the first fuse part 52c may have a groove or a hole formed therein to provide a greater electric resistance than the first upper body part 52a and the first lower body part 52b or one of the first upper body part 52a and the first lower body part 52b. The first fuse part 52c may be formed to have a greater electric resistance than the second fuse part 27 formed in the first collector plate 20. For example, the first fuse part 52c may be formed to have a greater electric resistance than the second fuse part 27 by forming the first fuse part 52c of a relatively low thickness or the first fuse part 52c may be formed to have a smaller fuse capacity than the second fuse part 27 by forming a relatively large hole or groove in the second fuse part 27.

The first fuse part 52c may function as a fuse that cuts off the flow of electric current by melting a region around the first fuse part 52c by heat generated when a large amount of current flows through the rechargeable battery 100 due to an electric short circuit. When the internal pressure of the rechargeable battery 100 exceeds a predefined pressure caused by heat generated during overcharge or decomposition of the electrolyte, or when second terminal plate 56 is connected to an external rechargeable battery and subsequently subjected to high-voltage disconnection, the inversion plate 60 may invert and contact the second terminal plate 56, causing an electric short circuit in the rechargeable battery 100. Accordingly, the first fuse part 52c melts before the second fuse part 27 formed inside the rechargeable battery 100 melts. Thus, following an electric short circuit, by separating the first electrode terminal 52 from the cell to generate arcing outside of the cell, the risk of abnormal explosion due to any arcing generated when the second fuse part 27 melts inside the cell is reduced (or prevented).

An insert molding part M may surround or cover a circumference of the first fuse part 52c and contact a gasket 54 and an electrically insulative or conductive connection plate 59b such that the insert molding part M may reinforce the strength of the first fuse part 52c against external impact. Accordingly, when the rechargeable battery 100 is exposed to an external impact (e.g., an unwanted external impact), the first fuse part 52c is not cut off easily. The insert molding part M may be resin, plastic, or equivalents thereof, but the present invention is not limited thereto. Further, the strength of the insert molding part M may be equal to or higher than that of the gaskets 54 and/or the connection plate 59b. Furthermore, it will be appreciated that the insert molding part M may be applied to all embodiments described hereinafter.

The second electrode terminal 53 passes through the other side of the cap plate 51 and is electrically connected to the second collector plate 30. The second electrode terminal 53 has substantially the same shape as that of the first electrode terminal 52, and a repeated explanation thereof is omitted herein. The second electrode terminal 53 may have the shape of a pillar, may omit a fuse part that corresponds to the first fuse part 52c, and is insulated from the cap plate 51.

The gaskets 54 are made of an insulating material and are positioned between the cap plate 51 and each of the first electrode terminal 52 and the second electrode terminal 53. The gaskets 54 seal a space between the cap plate 51 and each of the first electrode terminal 52 and the second electrode terminal 53. The gaskets 54 prevent external moisture from permeating into the inside of the rechargeable battery 100 and prevent an electrolyte contained in the rechargeable battery 100 from flowing out.

The first terminal plate 55 may be riveted to an upper pillar of the first electrode terminal 52 to fix the first electrode terminal 52 to the cap plate 51.

The second terminal plate 56 may be riveted to an upper pillar of the second electrode terminal 53 to fix the second electrode terminal 53 to the cap plate 51. The second terminal plate 56 is formed to allow the second electrode terminal 53 to be fitted thereto from the outside spaced apart from the cap plate 51, that is, above the upper insulation member 59a, and is formed to extend to cover the short-circuit hole 51c. The second terminal plate 56 is electrically connected to the second electrode terminal 53. When the internal pressure of the rechargeable battery 100 exceeds a predefined pressure, the inversion plate 60 may be inverted and protrude upwardly and convexly and contact the second terminal plate 56, causing an electric short circuit. This increase in internal pressure may occur following a high-voltage disconnection, for example, after the second terminal plate 56 is connected to an external rechargeable battery, or following overcharge of the rechargeable battery 100 or decomposition of electrolyte. The electric short circuit may cause large electric current flows and heat generation. The first fuse part 52c or the second fuse part 27 may function as a fuse, thereby improving the safety of the rechargeable battery 100.

The plug 57 seals an electrolyte injection hole 51a of the cap plate 51, and the vent plate 58 is installed in a vent hole 51b of the cap plate 51 and includes a notch 58a formed to be opened at a predetermined pressure.

The upper insulation member 59a is positioned between the second electrode terminal 53 and the cap plate 51 and contacts the cap plate 51 and the gasket 54. The upper insulation member 59a insulates the second electrode terminal 53 from the cap plate 51.

The connection plate 59b is positioned between the first electrode terminal 52 and the cap plate 51 and contacts the cap plate 51 and the gasket 54 through the first terminal plate 55. The connection plate 59b electrically connects the first electrode terminal 52 and the cap plate 51.

The inversion plate 60 is formed in the short-circuit hole 51c of the cap plate 51 and is secured between the upper insulation member 59a and the cap plate 51. The inversion plate 60 includes a downwardly convex round part and an edge part fixed to the cap plate 51. The inversion plate 60 may be inverted and upwardly convexly protrude following a high-voltage disconnection, for example, after the second terminal plate 56 is connected to an external rechargeable battery. When the rechargeable battery 100 is overcharged and/or when the electrolyte decomposes, heat may be generated, which increases the internal pressure of the rechargeable battery 100 and may cause the inversion plate 60 to invert so that it upwardly convexly protrudes. The inversion plate 60 may have the same polarity as the cap plate 51.

The lower insulation members 61 are formed between the cap plate 51 and each of the first collector plate 20 and the second collector plate 30 and prevent (or minimize the likelihood of) an unnecessary short circuit from occurring.

As described above, the rechargeable battery 100 according to one or more embodiments of the present invention includes the first electrode terminal 52 having the first fuse part 52c and the first collector plate 20 having the second fuse part 27. Accordingly, in an event of an electric short circuit, the first fuse part 52c formed outside the cell will melt before the second fuse part 27 formed inside the cell will melt. Thus, any arcing resulting from the electric short circuit will be generated outside the cell, rather than inside the cell.

Therefore, the safety of the rechargeable battery 100 according to one or more embodiments of the present invention can be improved by preventing abnormal breakdown of the rechargeable battery 100 during an electric short circuit.

Figure 5:
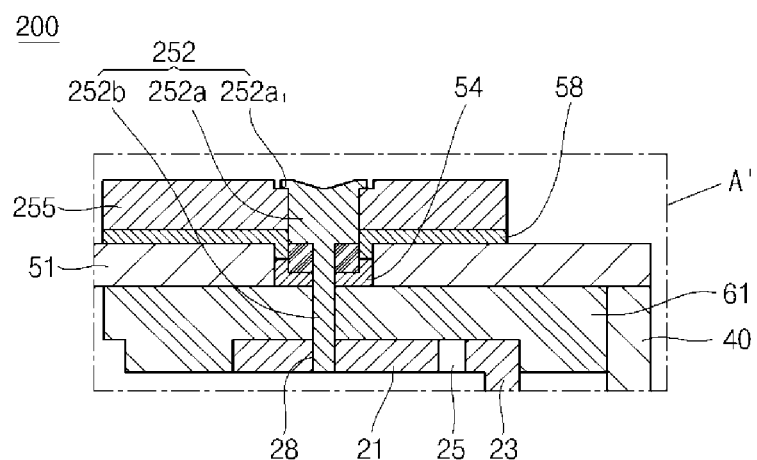
FIG. 5 is an enlarged cross-sectional view illustrating a section 'A' that corresponds to the section 'A' of FIG. 2 in a rechargeable battery according to another embodiment of the present invention.

FIG. 5 is an enlarged cross-sectional view illustrating a region 'A" that corresponds to the 'A' region of FIG. 2 in a rechargeable battery according to another embodiment of the present invention.

The rechargeable battery 200 according to another embodiment of the present invention has substantially the same configuration and functions as those of the rechargeable battery 100 shown in FIG. 2, except for a length of a first fuse part 252b formed in a first electrode terminal 252. Accordingly, in the rechargeable battery 200 according to one or more embodiments of the present invention, repeated explanations of the same components as those of the rechargeable battery 100 according to the previous embodiment of the present invention are omitted, and the following description primarily discloses the features of the first fuse part 252b formed in the first electrode terminal 252.

Referring to FIG. 5, the first electrode terminal 252 includes the first fuse part 252b that functions as a fuse. The first electrode terminal 252 includes an electrode body part 252a and the first fuse part 252b. The electrode body part 252a protrudes outside of the cap plate 51 and is coupled to a first terminal plate 255. The electrode body part 252a may be riveted to the first terminal plate 255, but is not limited thereto. When the electrode body part 252a is coupled to the first terminal plate 255 by riveting, a protrusion 252$a_1$ is formed to prevent the first electrode terminal 252 from being dislodged from the cap plate 51. The first fuse part 252b is formed to extend to the inside of the case 40 from one end (i.e., a bottom end) of the electrode body part 252a. The first fuse part 252b may be formed to have a relatively small thickness (as compared to the electrode body part 252a) so as to have greater electric resistance than the electrode body part 252a. The first fuse part 252b may also be formed to have a relatively small sectional area so as to have greater electric resistance than the electrode body part 252a. The thickness or sectional area of the first fuse part 252b may vary according to the fuse capacity required when a short circuit occurs to the rechargeable battery 200.

In addition, the first fuse part 252b may be formed to have greater electric resistance than the second fuse part 27 formed in the first collector plate 20. For example, the first fuse part 252b may be formed to have a greater electric resistance than the second fuse part 27 by forming the first fuse part 252b of a relatively low thickness or to have a smaller fuse capacity than the second fuse part 27 by forming a relatively large hole or groove in the second fuse part 27.

The first fuse part 252b may function as a fuse that cuts off the flow of electric current by melting a region around the first fuse part 252b by heat generated when a large amount of current flows through the rechargeable battery 200 due to an electric short circuit. When the internal pressure of the rechargeable battery 200 exceeds a predefined pressure caused by heat generated during overcharge or decomposition of the electrolyte, or when the second terminal plate 56 is connected to an external rechargeable battery and subsequently subjected to high-voltage disconnection, the inversion plate 60 may invert and contact the second terminal plate 56, causing an electric short circuit in the rechargeable battery 200. Accordingly, the first fuse part 252b melts before than the second fuse part 27 formed inside the rechargeable battery 200 melts. Thus, following an electric short circuit, the first fuse part 252b prevents the flow of electric current, thereby preventing (or minimizing) arcing generated when the second fuse part 27 formed inside the cell is melted, and ultimately preventing a risk of abnormal explosion of the rechargeable battery 200.

Figure 6:
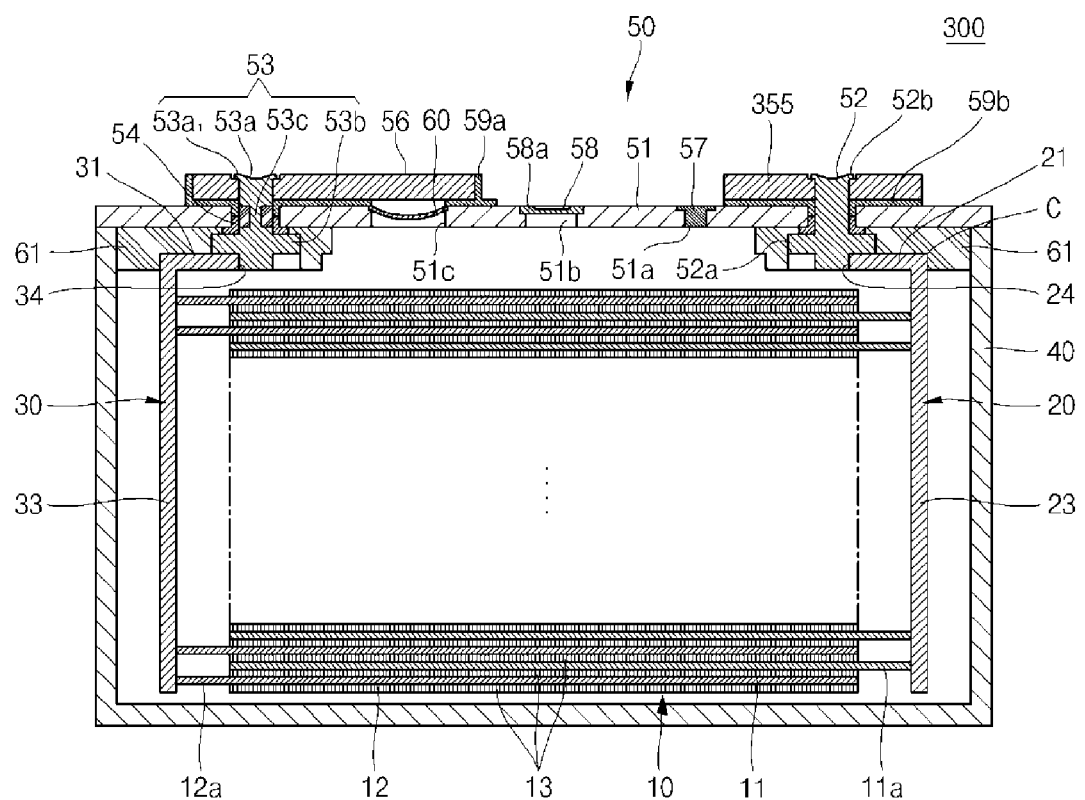
FIG. 6 is a cross-sectional view of a rechargeable battery according to another embodiment of the present invention.

FIG. 6 is a cross-sectional view of a rechargeable battery according to still another embodiment of the present invention.

The rechargeable battery 300 according to one or more embodiments of the present invention has substantially the same configuration and functions as those of the rechargeable battery 100 shown in FIG. 2, except that a first fuse part 52c is formed in a second electrode terminal 53, rather than in a first electrode terminal 52, and a first collector plate 20 does not include a second fuse part corresponding to the second fuse part 27 of the rechargeable battery 100. Accordingly, in the rechargeable battery 300 according to one or more embodiments of the present invention, repeated explanations of the same components as those of the rechargeable battery 100 according to the previous embodiment of the present invention are omitted, and the following description primarily discloses the features of a first fuse part 53c formed in the second electrode terminal 53.

Referring to FIG. 6, the rechargeable battery 300 includes an electrode assembly 10, a first collector plate 20, a second collector plate 30, a case 40 and a cap assembly 50.

The cap assembly 50 includes a first electrode terminal 52 and a second electrode terminal 53, each protruding to the outside of the case 40 and coupled to a first terminal plate 55 and a second terminal plate 56, respectively.

The second electrode terminal 53 passes through the cap plate 51 and is electrically coupled to the second collector plate 30.

The second electrode terminal 53 may have the shape of a pillar and may include a second upper body part 53a exposed to an upper portion of the cap plate 51, a second lower body part 53b positioned under the cap plate 51, and a second fuse part 53c at or below the upper portion of the cap plate 51.

The second upper body part 53a may be riveted to the second terminal plate 56 positioned outside the case 40 and a protrusion part 53$a_1$ may be formed to prevent the second electrode terminal 53 from being dislodged from the cap plate 51.

The second lower body part 53b is connected to the second collector plate 30 positioned inside the case 40 (i.e., is connected to the second electrode plate 12) and a flange is formed to prevent the second electrode terminal 53 from being dislodged from the cap plate 51. In addition, a portion of the pillar of the second lower body part 53b positioned under the flange is fitted into the second terminal hole 34 of the second collector plate 30. The second electrode terminal 53 may be electrically insulated from the cap plate 51.

The first fuse part 53c is formed between the second upper body part 53a and the second lower body part 53b. The first fuse part 53c may have a relatively small thickness so as to have greater electric resistance than the second upper body part 53a and the second lower body part 53b or one of the second upper body part 53a and the second lower body part 53b. In addition, the first fuse part 53c may have a relatively small sectional area so as to have greater electric resistance than the second upper body part 53a and the second lower body part 53b or one of the second upper body part 53a and the second lower body part 53b. The thickness or sectional area of the first fuse part 53c may vary according to the fuse capacity required following a short circuit in the rechargeable battery 100.

In one or more embodiments, the first fuse part 53c may have a groove or a hole formed therein to provide a greater electric resistance than the second upper body part 53a and the second lower body part 53b or one of the second upper body part 53a and the second lower body part 53b. In addition, the first fuse part 53c may be formed of a material that is different than the second upper body part 53a and the second lower body part 53b and that has a greater electric resistance. For example, the first fuse part 53c may be made of a clad metal having greater electric resistance than a material, i.e., copper (Cu), of the second upper body part 53a and the second lower body part 53b.

The first fuse part 53c functions as a fuse that cuts off the flow of electric current by melting a region around the first fuse part 53c by heat generated when a large amount of current flows through the rechargeable battery 300 due to an electric short circuit. When the internal pressure of the rechargeable battery 300 exceeds a predefined pressure caused by heat generated during overcharge or decomposition of the electrolyte, or when the second terminal plate 56 is connected to an external rechargeable battery and subsequently subjected to high-voltage disconnection, the inversion plate 60 may invert and contact the second terminal plate 56, causing an electric short circuit in the rechargeable battery 300. Accordingly, after an electric short circuit, the first fuse part 53c generates arcing from the outside of the rechargeable battery 300, i.e., outside of the cell, while separating the second electrode terminal 53 from the cell, thereby improving the internal safety of the cell.

Figure 7A:
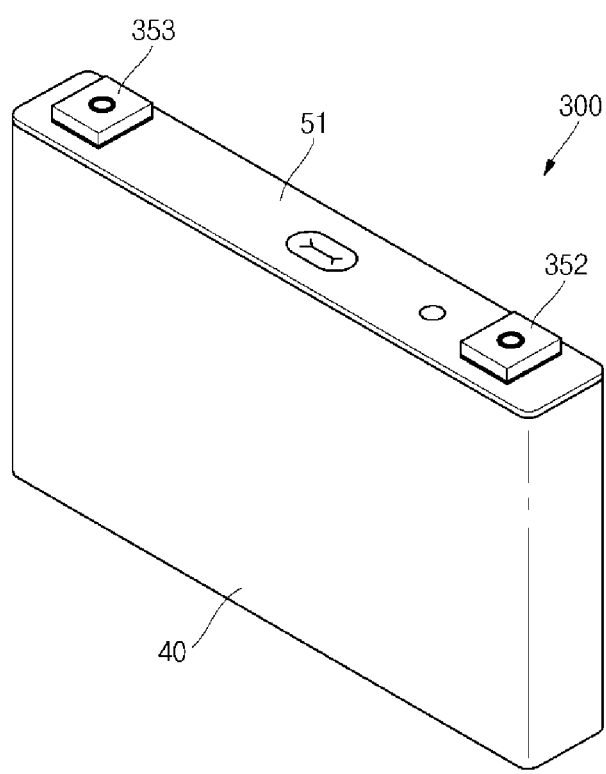
FIGS. 7A and 7B are a perspective elevation view and a cross-sectional view of a rechargeable battery according to another embodiment of the present invention.
Figure 7B:
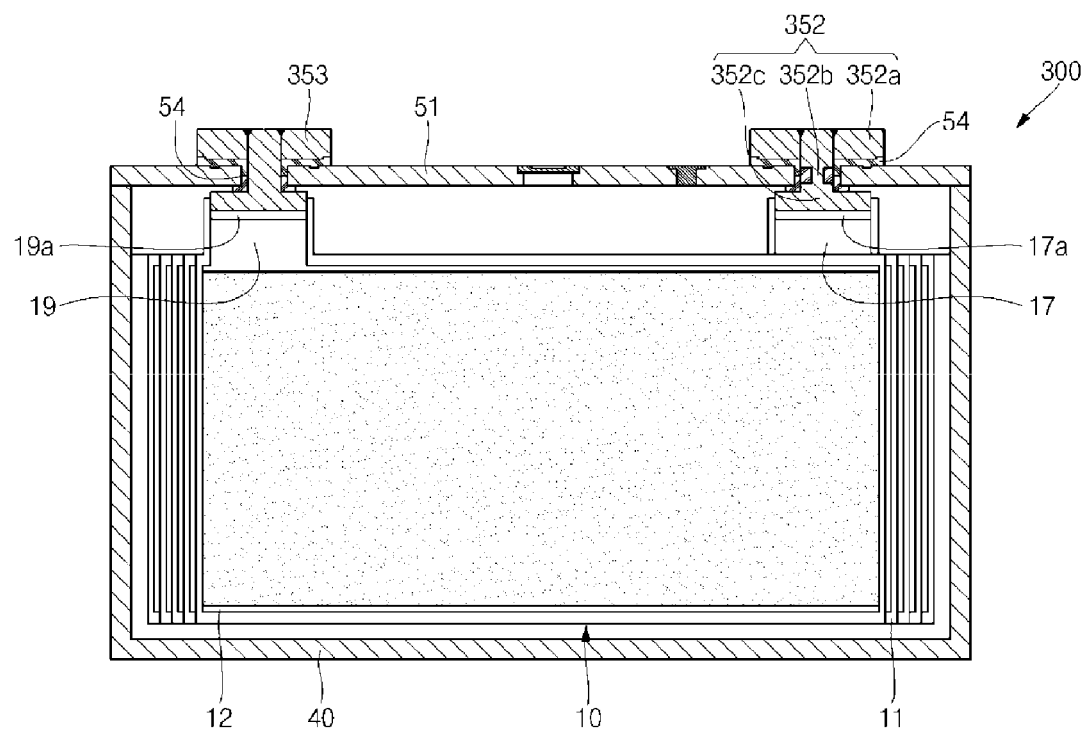

FIGS. 7A and 7B are a perspective view and a cross-sectional view of a rechargeable battery according to still another embodiment of the present invention.

The rechargeable battery 300 shown in FIGS. 7A and 7B may be applied to an electric vehicle or a hybrid vehicle. Since the rechargeable battery 300 shown in FIGS. 7A and 7B has substantially the same configuration as that of the rechargeable battery 100 or 200, the following description primarily discloses differences between the rechargeable battery 100 or 200 and the rechargeable battery 300.

As illustrated in FIGS. 7A and 7B, a first electrode tab 17 and a second electrode tab 19 connected to a first electrode plate 11 and a second electrode plate 12 of an electrode assembly 10, are positioned between a cap plate 51 and the electrode assembly 10, and are electrically connected to a first electrode terminal 352 and a second electrode terminal 353 through a first electrode lead 17a and a second electrode lead 19a, respectively.

The first electrode terminal 352 includes a first upper body part 352a exposed to an upper portion of the cap plate 51 and a first lower body part 352b and a first fuse part 352c positioned under the cap plate 51. The first fuse part 352c is formed to have a relatively small thickness so as to have greater electric resistance than the first upper body part 352a and the first lower body part 352b or one of the first upper body part 352a and the first lower body part 352b. In addition, the first fuse part 352c is formed to have a relatively small sectional area so as to have greater electric resistance than the first upper body part 352a and the first lower body part 352b or one of the first upper body part 352a and the first lower body part 352b. The first fuse part 352c functions as a fuse that cuts off the flow of electric current by melting a region around the first fuse part 352c by heat generated when a large amount of current flows through the rechargeable battery 300 due to an electric short circuit. Accordingly, the first fuse part 352c is rapidly melted by the electric short circuit and generates arcing from the outside of the cell while separating the first electrode terminal 352 from the cell, thereby preventing a risk of abnormal explosion from occurring inside the cell.

Since the second electrode terminal 353 has substantially the same configuration as the first electrode terminal 352, a repeated explanation thereof is omitted. However, a component corresponding to the first fuse part 352c of the first electrode terminal 352 may be omitted in the second electrode terminal 353.

In order to ensure safety of the rechargeable battery 300 for use in an electric vehicle during penetration or puncture of the rechargeable battery 300, the cap plate 51 and the case 40 should not have polarities, so that the first electrode terminal 352 and the second electrode terminal 353 may be insulated from the cap plate 51. In one or more embodiments, the first electrode terminal 352 and the second electrode terminal 353 may be electrically insulated from the cap plate 51 by a gasket 54.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
    an electrode assembly comprising a first electrode plate, a second electrode plate and a separator between the first electrode plate and the second electrode plate;
    a case accommodating the electrode assembly; and
    a first electrode terminal and a second electrode terminal electrically connected to the first electrode plate and the second electrode plate, respectively, and protruding to the outside of the case,
    wherein the first electrode terminal comprises:
        a first upper body part coupled to a first terminal plate outside the case;
        a first lower body part connected to the first electrode plate inside the case; and
        a first fuse part between the first upper body part and the first lower body part.

2. The rechargeable battery of claim 1, wherein the first fuse part has a greater electrical resistance than the first upper body part and the first lower body part.

3. The rechargeable battery of claim 1, wherein the first fuse part has a smaller sectional area than at least one of the first upper body part and the first lower body part.

4. The rechargeable battery of claim 1, wherein the first fuse part has a smaller thickness than at least one of the first upper body part and the first lower body part.

5. The rechargeable battery of claim 1, wherein the first electrode terminal comprises:
    an electrode body part protruding outside of the case; and
    wherein the first fuse part extends to the inside of the case from one end of the electrode body part.

6. A rechargeable battery comprising:
    an electrode assembly comprising a first electrode plate, a second electrode plate and a separator between the first electrode plate and the second electrode plate;
    a case accommodating the electrode assembly; and
    a first electrode terminal and a second electrode terminal electrically connected to the first electrode plate and the second electrode plate, respectively, and protruding to the outside of the case,
    wherein the second electrode terminal comprises:
        a second upper body part coupled to a second terminal plate outside the case;
        a second lower body part connected to the second electrode plate inside the case; and
        a second fuse part between the second upper body part and the second lower body part.

7. The rechargeable battery of claim 6, wherein the second fuse part has a greater electrical resistance than at least one of the second upper body part and the second lower body part.

8. The rechargeable battery of claim 6, wherein the second fuse part has a smaller sectional area than at least one of the second upper body part and the second lower body part.

9. The rechargeable battery of claim 6, wherein the second fuse part has a smaller thickness than the second upper body part and the second lower body part or one of the second upper body part and the second lower body part.

10. The rechargeable battery of claim 6, further comprising a first collector plate and a second collector plate at opposite sides of the electrode assembly to electrically connect the first electrode plate and the second electrode plate to the first electrode terminal and the second electrode terminal, respectively, and wherein the first collector plate comprises a third fuse part.

11. The rechargeable battery of claim 10, wherein the first collector plate further comprises:
   a connection part coupled to the first electrode terminal; and
   an extension part extending from the connection part and coupled to the first electrode plate.

12. The rechargeable battery of claim 11, wherein the connection part comprises the third fuse part and wherein the third fuse part is spaced apart from the first electrode terminal.

13. The rechargeable battery of claim 10, wherein the electrical resistance of the first fuse part is greater than the electrical resistance of the third fuse part.

14. The rechargeable battery of claim 10, further comprising a cap assembly sealing the case, the cap assembly comprising:
   a cap plate having a short-circuit hole, and
   an inversion plate in the short-circuit hole.

15. The rechargeable battery of claim 14, wherein the first fuse part has a height in a lengthwise direction of the first electrode terminal that is equal to or smaller than a thickness of the cap plate.

16. The rechargeable battery of claim 14, wherein the inversion plate comprises:
   a round part that is downwardly convex; and
   an edge part fixed to the cap plate.

17. The rechargeable battery of claim 14, wherein when the internal pressure of the rechargeable battery exceeds a predefined pressure, the inversion plate is inverted to make contact with the second terminal plate.

18. The rechargeable battery of claim 14, wherein the inversion plate is electrically connected to the second electrode plate.

19. The rechargeable battery of claim 1, wherein the fuse part is surrounded by an insert molding part.

* * * * *